United States Patent

[11] 3,623,575

[72] Inventors Raymond Joseph
 Schiltigheim;
 Roger Manin, Paris, both of France
[21] Appl. No. 887,968
[22] Filed Dec. 24, 1969
[45] Patented Nov. 30, 1971
[73] Assignees Ateliers Reunis Schiltigheim
 (Bas-Rhin), France;
 Guitel Etienne-Mobilor, Gervais
 (Seine Saint-Denis), France
[32] Priority Dec. 31, 1968
[33] France
[31] 182347

[54] SELF-LOCKING WHEEL
 7 Claims, 5 Drawing Figs.
[52] U.S. Cl. ................................................ 188/31,
 188/19, 188/134, 188/177
[51] Int. Cl. .................................................... B60t 7/12
[50] Field of Search ........................................ 188/19, 31,
 82.2, 82.3, 82.84, 114, 134–136, 140 R, 177

[56] References Cited
 FOREIGN PATENTS
 463,099 4/1951 Italy ............................. 188/82.2

Primary Examiner—Duane A. Reger
Attorney—Michael S. Striker

ABSTRACT: A wheel for a vehicle which incorporates an automatic locking device comprising two movable locking members. The body of said wheel comprises a space containing said locking members normally disposed on either side of a vertical plane containing the wheel axis, said locking members being mounted for free movement on a support rigid with the wheel support, for example, its mounting strap or fork, a series of notches being provided on the other hand along the outer periphery of said space containing said pair of locking members so as to receive one or the other locking member when said locking member is caused to move in one or the other direction by gravity as a consequence of the inclination of their support beyond a certain angle to the vertical.

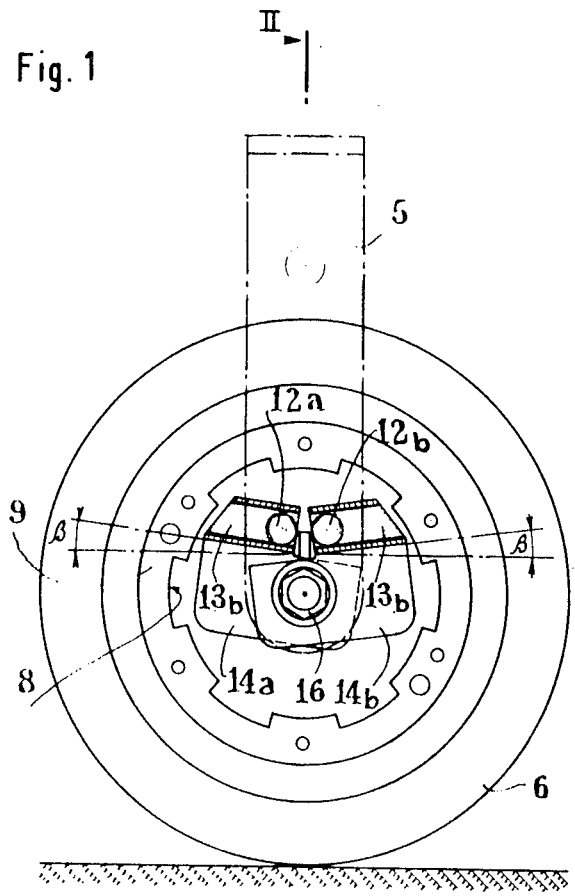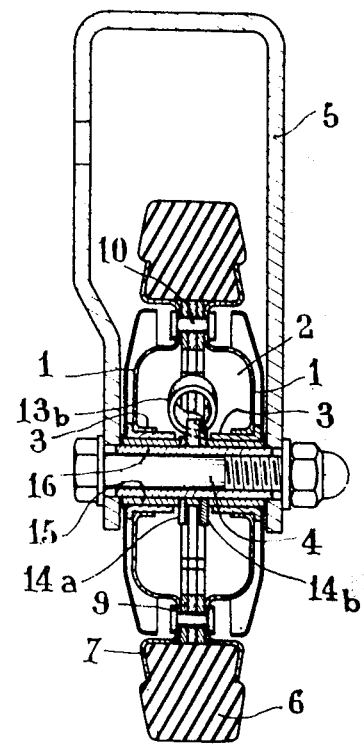

SELF-LOCKING WHEEL

The present invention relates to wheels adapted to equip carriages, carts, trolleys and similar vehicles.

More particularly, it relates to wheels of this character which incorporate a self-locking device for locking the wheel against rotation when the cart equipped therewith engages an inclined plane.

This device is particularly advantageous for example in the case of shopping carts of the type put at the disposal of customers in self-service or large shops for transporting the articles bought by the customers, when the shop comprises several stories interconnected by inclined endless-belt elevators. In fact, in this case the carts should be capable of being safely locked in position when placed upon such belt elevators or travelling-bands, in order to prevent the carts from moving down by gravity.

To obtain this locking effect various wheel-locking means have already been proposed; however, hitherto known systems are not fully satisfactory inasmuch as they require as a rule a particular maneuver from the user.

Therefore, it is the scope of the present invention to provide a cart wheel comprising a locking device adapted to operate automatically without any intervention from the user when the cart is positioned upon a slope requiring the holding of the cart against its natural downward motion by gravity.

To this end, the cart wheel according to this invention is provided with a locking device comprising a locking member proper adapted to coact with teeth or notches formed in the wheel rim.

However, this wheel is further characterized in that it comprises within the space defined by its rim a pair of locking members normally disposed on either side of the vertical plane containing the wheel axis, said locking member being mounted for free movement on a support rigid with the wheel axle support, for example a mounting or fastening strap, or fork, the outer periphery of said space comprising on the other hand a series of notches adapted to be engaged by one or the other locking member when these locking members are urged in one or the other direction by gravity as a consequence of an inclination of their support in relation to the vertical, therefore of an inclination of the cart or like vehicle equipped with the wheel.

In an advantageous form of embodiment the two locking members of the device are mounted for free movement in a pair of guideways formed on the support or supports of said member which extends or extend on either side of the vertical plane containing the wheel axis, said guideways being disposed above the level of this axis and forming a wide-angle V-opening upwards.

Thus, when the corresponding cart is in a normal horizontal position the angle of inclination of each guideway to the horizontal is the same. In other words, the magnitude of this guideways inclination will determine the value of the cart inclination beyond which either of said locking member will become operative and lock the wheel.

However, other characteristic features and advantages of the cart wheel according to this invention will appear as the following description proceeds with reference to the attached drawing in which:

FIG. 1 is a part-sectional and part-elevational view showing a wheel equipped with the locking device of this invention:

FIG. 2 is a cross section taken along the line II—II of FIG. 1;

Figure 3:
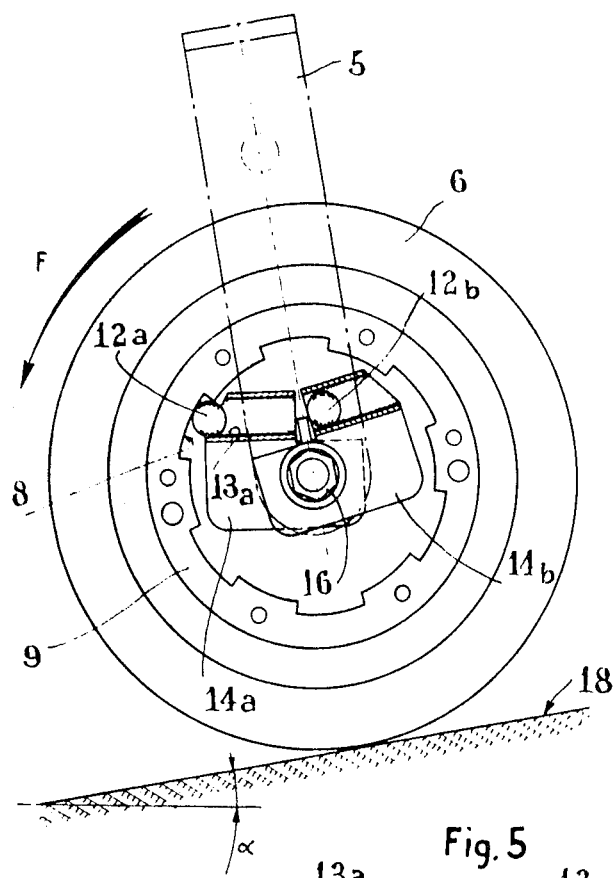
FIG. 3 is a view similar to FIG. 1, but showing the same wheel during the operation of the wheel-locking device.
Figure 4:
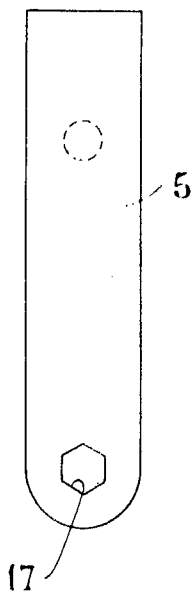
FIG. 4 is a side-elevational view of the strap supporting said wheel.

The wheel body consists of a pair of opposite steel pressings or symmetric flanges 1 assembled along their outer peripheral edges. These flanges are so shaped as to provide therebetween a space 2 adapted to receive the wheel-locking device.

Each flange 1 has a central hole with a tubular insert welded thereto and forming a collar 3 extending inwards. The two collars 3 carried by these flanges are adapted to constitute the wheel hub.

The axis of rotation of the wheel consists of a large bolt 4 carried by the wheel support, in this case a strap or fork 5 adapted to be secured to the body, frame or like structure of the cart (not shown) to be equipped with the wheel of this invention.

The outer peripheral portions of the pair of flanges 1 comprise suitably shaped extensions 7 adapted to constitute the wheel rim. The wheel-type 6 is fitted between these extensions 7 as shown in FIG. 2.

As already explained in the foregoing, the wheel-locking device is housed within the hollow space 2 formed between the two flanges 1. This device comprises a pair of movable locking members proper adapted to engage notches formed in the outer periphery of said space 2. These notches 8 are formed on the inner circular edge or edges of one or a plurality of rings or like annular members 9 carried by, and clamped between the flanges 1.

In fact, these rings 9 are clamped between the outer peripheral edges of flanges 1 and these are assembled by screws or rivets 10 extending through aligned holes 11 formed in said flanges 1 and said rings 9.

In the example illustrated the two locking members of the device consists of balls 12a and 12b. These balls are normally disposed on either side of the vertical plane II—II containing the wheel axis.

Each ball 12a, 12b is adapted to roll in a separate guideways and the two guideways thus provided are inclined in opposite and upward directions to form the arms of a wide-angle V (see FIG. 1).

In the example illustrated each guideway consists of a cylindrical or tubular member 13a, 13b respectively formed for example, by rolling or bending the upper marginal portion of a vertical plate 14a, 14b. These plates are disposed at right angles to the wheel axis and secured to a common socket 15 about which the wheel hub consisting of said collars 3 of flanges 1 can revolve freely.

This socket 15 may consist in turn of a plurality of successive sections rigid with an inner tubular member 16 through which the wheel axle 4 is disposed. In this respect it may be emphasized that the pair of plates 14a and 14b constituting the support for the pair of guideways of the locking member or balls 12a and 12b must necessarily be rotatably solid the inner tubular member 16, through the medium of the component elements of said socket 15.

Figure 5:
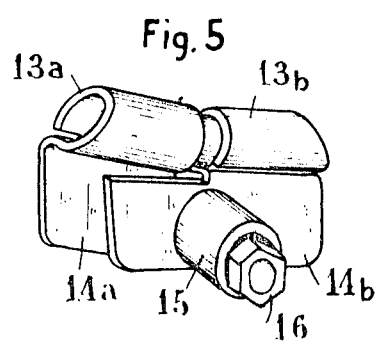
FIG. 5 is a perspective view showing the supports of the pair of movable locking members.

The ends of this inner tubular member 16 have a polygonal contour as clearly shown in FIG. 5. Now these ends are engaged into a pair of holes 17 of corresponding polygonal contour which are formed through the end portions of the arms of the strap or fork 5 constituting the wheel support.

Under these conditions, the tubular member 16 is rotatably rigid with this support when the latter is caused to rotate about the wheel axle 4, i.e. when the frame, body or like structure of the cart supported by this wheel is inclined to the horizontal. Thus, the supports 14a and 14b of the pair of tubular guideways housing the balls 12a and 12b are also caused to pivot to the same extent about the wheel axis.

In other words, the two guideways 13a and 13b of said locking balls are subjected to the changes of inclination of the strap or fork 5, and therefore of the cart rigid with said strap.

When the cart is rolling on a horizontal or nearly horizontal surface the side arms of this strap or fork extend vertically and the pair of guideways 13a and 13b form an angle $\beta$ to the horizontal.

The value of this angle $\beta$ is such that one or the other ball 12a, 12b is caused to roll by gravity in its guideways and eventually engage one of the registering notches 8 when the cart body is inclined beyond a maximum angle to the horizontal thus causing the desired wheel-locking effect.

Thus in the example illustrated in FIG. 3, the inclination of the pair of guideways 13a and 13b is such that this locking action takes place when the cart body is engaged on an inclined surface 18 forming an angle α of 10° to the horizontal.

This result is obtained because the change in the inclination of the guideways 13a causes the locking ball 12a therein to move by gravity and project from this guideway so as to engage a registering notch 8. Under these conditions, the wheel cannot rotate freely in the direction of the arrow F and the cart equipped with this wheel is held against motion on the inclined plane 18 so that it is safely prevented from moving downwards by gravity.

Of course, if the cart had been inclined in the opposite direction the same effect would have been obtained, but in this case the other ball 12b would have locked the wheel against rotation.

In either case this wheel is released for free rotation when the body of the cart is restored to its normal position, i.e. by placing this cart on a horizontal surface.

Thus, the present locking device will automatically lock against movement a cart of which the wheels are equipped with this device, this locking action occuring immediately when the cart engages an inclined surface having a predetermined inclination.

In this respect it may be noted that the device may be so constructed that it will operate when its angle of inclination assumes different values, the angle of inclination β of the pair of opposite guideways 13a and 13b of the locking balls 12a and 12b being modified accordingly.

The essential feature characterizing this locking device incorporated in a cart wheel or the like lies of course in the fact that the wheel is locked in a fully automatic manner when the inclination of the corresponding cart is sufficient to justify the holding thereof against motion and safely prevent its movement by gravity.

This result is obtained without requiring any intervention from the user.

Of course, the subsequent release of the wheel takes place likewise in a fully automatic manner when the cart is restored to a substantially horizontal position.

Besides, it may be noted that the design of the locking device of this invention is particularly simple so that its cost may be extremely low. Moreover, this device is perfectly protected against undesired external influences or actions, since its various component elements are disposed within a closed space formed by the pair of flanges 1 constituting the wheel disc.

As already explained in the foregoing, the wheels equipped with the device according to the present invention are intended more particularly and advantageously for equipping shopping carts of the type put at the disposal of customers in a self-service shop to facilitate the transport of the articles bought by them. However, due to their peculiar features, these wheels are also adaptable to different vehicles. Thus, the wheel locking device of this invention may also be used in wheel-mounted furniture and in other objects adapted to travel on inclined endless-belt elevators and the like.

However, the self-locking wheels according to this invention are not intended solely for holding a cart or other movable object against motion on such inclined endless-belt elevators. In fact, these wheels may also be used for holding against motion a cart or other movable object when the latter is left by its user on an inclined ground or floor.

Besides, it will be readily apparent that this locking device should not be construed as being limited to the single exemplary form of embodiment described and illustrated herein by way of illustration, since the pair of guideways 13a and 13b could be embodied in a different manner, and replaced by any other suitable guideways of adequate shape and type.

Finally, the locking balls 12a and 12b may be replaced by any other suitable locking member, for example rollers, or movable pawls comprising a portion adapted to engage one of the notches 8.

We claim:

1. A wheel for a vehicle comprising an elongated support adapted to be fixed to the vehicle for supporting the latter, said elongated support normally extending in a predetermined direction; an axle carried by said support; a wheel body rotatably mounted on said axle and defining an inner annular space; a series of circumferentially spaced notches provided on the outer periphery of said space; a pair of locking members, each movable in said space between an inactive position respectively located closely adjacent and on opposite sides of a vertical plane containing the wheel axis and a locking position engaged in one of said notches; and support means connected to said elongated support and supporting said locking members for movement from said inactive to said locking position upon inclination of said elongated support to either side of said predetermined direction.

2. A wheel according to claim 1, in which said support means of said locking members comprise a pair of guideways in which said locking members are mounted for free movement, said guideways extending on either side of the vertical plane containing the axis of rotation of said wheel, said pair of guideways being disposed above the level of said axis and extending along a pair of straight lines forming a relatively wide V-opening upwards and of which the angle of inclination to the horizontal, in the substantially horizontal position of the cart, will determine the angle of inclination of said cart beyond which either of said locking member will become operative by engaging a registering notch, of the outer periphery of said space provided in said wheel body.

3. A wheel according to claim 2, in which said movable locking members consist of a pair of balls and their guideways consist of a pair of cylindrical tubular portions provided on the supports means of said members.

4. A wheel according to claim 1 in which said elongated support of said wheel comprise a fork and said support means of said locking members are rigid with a socket surrounding the wheel axle rigid in turn with the pair of arms of said fork, and said wheel body being freely rotatable about said socket.

5. A wheel according to claim 1, in which said wheel body consists of a pair of hollow flanges forming therebetween said space containing said locking members, said flanges being assembled along their outer peripheral portions.

6. A wheel according to claim 5, in which said notches provided along the outer periphery of said space containing said locking members are formed on the inner wall of a ring disposed between the outer peripheral portions of the flanges constituting the wheel body.

7. A wheel according to claim 1, wherein said predetermined direction is substantially vertical and wherein said support means is connected to said elongated support above the axis of said wheel.

* * * * *